(12) United States Patent
Huang

(10) Patent No.: US 7,652,649 B2
(45) Date of Patent: Jan. 26, 2010

(54) LCD DEVICE WITH IMPROVED OPTICAL PERFORMANCE

(75) Inventor: Hsueh-Ying Huang, Sanchong (TW)

(73) Assignee: AU Optronics Corporation, Hsinchu (TW)

( * ) Notice: Subject to any disclaimer, the term of this patent is extended or adjusted under 35 U.S.C. 154(b) by 609 days.

(21) Appl. No.: 11/154,773

(22) Filed: Jun. 15, 2005

(65) Prior Publication Data

US 2006/0284811 A1 Dec. 21, 2006

(51) Int. Cl.
G09G 3/36 (2006.01)
(52) U.S. Cl. .......................... 345/90; 345/98
(58) Field of Classification Search .......... 345/87–107, 345/204–215
See application file for complete search history.

(56) References Cited

U.S. PATENT DOCUMENTS

| | | | | |
|---|---|---|---|---|
| 5,151,805 | A | | 9/1992 | Takeda et al. ................. 359/57 |
| 6,031,514 | A | * | 2/2000 | Hashimoto et al. ............ 345/92 |
| 6,243,069 | B1 | | 6/2001 | Ogawa et al. ................. 345/102 |
| 6,278,427 | B1 | * | 8/2001 | Matsumoto et al. ........... 345/88 |
| 6,392,626 | B1 | * | 5/2002 | Moon .......................... 345/92 |
| 6,590,552 | B1 | * | 7/2003 | Yokoyama et al. ............ 345/92 |
| 6,760,081 | B2 | | 7/2004 | Takagi ......................... 349/38 |
| 7,271,789 | B2 | * | 9/2007 | Lee et al. ..................... 345/87 |
| 2002/0084969 | A1 | * | 7/2002 | Ozawa ......................... 345/96 |
| 2003/0063074 | A1 | * | 4/2003 | Kumagawa et al. ......... 345/204 |
| 2003/0112213 | A1 | * | 6/2003 | Noguchi et al. .............. 345/96 |
| 2004/0041778 | A1 | * | 3/2004 | Hiraki et al. ................. 345/100 |
| 2005/0083279 | A1 | * | 4/2005 | Lee et al. ..................... 345/87 |

FOREIGN PATENT DOCUMENTS

| | | | |
|---|---|---|---|
| JP | 05072995 A | * | 3/1993 |
| JP | 2001-184037 | | 7/2001 |
| TW | 05-027218 | | 2/1993 |
| TW | 550531 | | 9/2003 |
| TW | 588320 | | 5/2004 |

* cited by examiner

*Primary Examiner*—Chanh Nguyen
*Assistant Examiner*—Adam J Snyder
(74) *Attorney, Agent, or Firm*—Ware, Fressola, Van Der Sluys & Adolphson, LLP

(57) ABSTRACT

In an LCD pixel, the pixel voltage is usually reduced after a gate line signal has passed. To compensate for this voltage reduction, the voltage applied to the charge storage capacitor in the pixel is increased from Vcom to Vcom1 after the gate line signal has passed. Voltage adjustment can be achieved by using two switching elements connected to the second end of the charge storage capacitor. One is activated by the gate line signal so that the applied voltage is equal to Vcom, and the other is activated by the next gate line signal so that the applied is increased to Vcom1. In a transflective LCD panel or a color LCD panel, each pixel is divided into two or three sub-pixels, each sub-pixel having a separate charge storage capacitor, a similar Vcom change is applied to each of the charge storage capacitors in the pixel.

18 Claims, 12 Drawing Sheets

LCD DEVICE WITH IMPROVED OPTICAL PERFORMANCE

FIELD OF THE INVENTION

The present invention relates to a liquid crystal display and, in particular, to a liquid crystal display with reduced feed-through potential drop.

BACKGROUND OF THE INVENTION

In a liquid crystal display comprising a plurality of gate lines and data lines, and an array of pixels arranged between adjacent gates lines and data lines, it is desirable to maintain the voltage potential on a pixel (m, n) over a reasonable period of time after the signal at the gate-line has changed from an H-state ($V_{gh}$) to an L-state ($V_{gl}$). The voltage potential is maintained by the charge capacity of each pixel. The charge is partially stored in the liquid crystal layer between the pixel electrodes, one of which is connected to a common electrode and the other is connected to the data line n through a switching element. As shown in FIG. 1, the charge capacity associated with the liquid crystal layer is represented by $C_{lc}$, and the switching element is a TFT. In order to increase the charge storage capacity, a charge storage capacitor $C_{st}$ is connected in parallel to the electrodes and another capacitor $C_{gs}$ is connected in parallel to the TFT.

As the signal at the gate-line m changes from $V_{gh}$ to $V_{gl}$, the drop in the voltage potential across the storage capacitor $C_{gs}$ causes the voltage potential in the pixel relative to the common electrode to reduce by an amount of $$\Delta V_f = C_{gs}(V_{gh}-V_{gl})/(C_{gs}+C_{lc}+C_{st}). \tag{1}$$

The drop in the voltage potential in the pixel, as illustrated in FIG. 2, is known as the feed-through potential drop. The feed-through potential drop significantly affects the contrast in a black-and-white (B/W) LCD device and the shape of the gamma curve in a color LCD device.

In prior art, a different shape of the gate line signal is used to compensate for the drop in the voltage potential. As shown in FIG. 3, one end of the storage capacitor $C_{st}$ is connected to an adjacent gate-line m−1, instead of the common line. Furthermore, the signal on the gate lines has three voltage levels $V_{gh}$, $V_{gc}$ and $V_{gl}$, as shown in FIG. 4, instead of two levels $V_{gh}$ and $V_{gl}$. When the signal on the gate line m+1 is changed from $V_{gl}$ to $V_{gh}$, the signal on the gate line m−1 is changed from $V_{gc}$ to $V_{gl}$. As a result, the voltage potential in pixel (m, n) is pulled upward in a first step. When the signal on the gate-line m is changed from $V_{gc}$ to $V_{gl}$, the voltage potential at pixel (m, n) is further pulled upward in a second step. As such, the feed-through potential drop can be partially compensated. In such a scheme, $V_{gc}$ is determined by $V_{gh}$, $V_{gl}$, $C_{st}$ and $C_{gs}$ as follows:

$$(V_{gc}-V_{gl})C_{st}=(V_{gl}-V_{gh})C_{gs} \tag{2}$$

This three-step gate-line signal is useful only when the storage capacitors $C_{st}$ are tied to the gate lines, but it cannot be used when the storage capacitors $C_{st}$ are tied to the common lines.

SUMMARY OF THE INVENTION

In a liquid crystal display (LCD) panel having a plurality of pixels, each having a first electrode connected to a common line, a second electrode connected to a data line through an TFT and a charge storage capacitor connected to the second electrode at the first capacitor end, the voltage applied to the second capacitor end is equal the voltage at the common line, or Vcom. After the gate line signal has passed, a reduction in the voltage potential between the first and second electrodes occurs. This voltage reduction is known as the feed-through potential drop. In order to compensate for this voltage potential reduction, the voltage applied to the second end of the charge storage capacitor is increased from Vcom to Vcom1 after the gate line signal has passed. This applied voltage adjustment can be achieved by using two switching elements connected to the second end of the charge storage capacitor. One switching element is activated by the gate line signal so that the applied voltage is equal to Vcom. The other switching element is activated by the next gate line signal so that the applied is increased to Vcom1.

In a large LCD panel where a gate line signal is used to activate a row of pixels from one side of the panel to the other side, it is possible that the change from Vcom to Vcom1 is made on the entire panel or only on one side of the panel. It is also possible that the change on one side of the panel is from Vcom to Vcom1 and the change on the other side of the panel is from Vcom to Vcom2. Vcom2 can be smaller or greater than Vcom1.

In a transflective LCD panel where each of the pixels has a transmission area and a reflection area and each area has a separate charge storage capacitor, a similar Vcom change is applied to the charge storage capacitor associated with the transmission area and the charge storage capacitor associated with the reflection area. Likewise, in a color LCD panel where each of the pixels has three color sub-pixels and each sub-pixel has a separate charge storage capacitor, a similar Vcom change is applied to each of the charge storage capacitors in the pixel.

Furthermore, Vcom1 can be adjusted according to the temperature of the LCD panel.

The present invention will become apparent upon reading the description taken in conjunction with FIGS. 5-13.

BRIEF DESCRIPTION OF THE DRAWINGS

FIGS. 2a-2e show the signal levels in a pixel as shown in FIG. 1, wherein

FIG. 2a is a timing diagram showing the signal level at a gate line m−1;

FIG. 2b is a timing diagram showing the signal level at a gate line m;

FIG. 2c is a timing diagram showing the signal level at a gate line m+1;

FIG. 2d is a timing diagram showing the signal level at a data line n;

FIG. 2e is a timing diagram showing the voltage level of a pixel (n, m).

FIGS. 4a-4e show the signal levels in a pixel as shown in FIG. 3, wherein

FIG. 4a is a timing diagram showing the signal level at a gate line m−1;

FIG. 4b is a timing diagram showing the signal level at a gate line m;

FIG. 4c is a timing diagram showing the signal level at a gate line m+1;

FIG. 4d is a timing diagram showing the signal level at a data line n;

FIG. 4e is a timing diagram showing the voltage level of a pixel (n, m).

FIGS. 6a-6f show the signal levels in a pixel as shown in FIG. 5, wherein FIG. 6a is a timing diagram showing the signal level at a gate line m−1;

FIG. 6b is a timing diagram showing the signal level at a gate line m;

FIG. 6c is a timing diagram showing the signal level at a gate line m+1;

FIG. 6d is a timing diagram showing the signal level at a data line n;

FIG. 6e is a timing diagram showing the voltage level of a pixel (n, m).

FIG. 6f is a timing diagram showing the voltage level at a charge storage capacitor in the pixel.

DETAILED DESCRIPTION OF THE INVENTION

Figure 3:
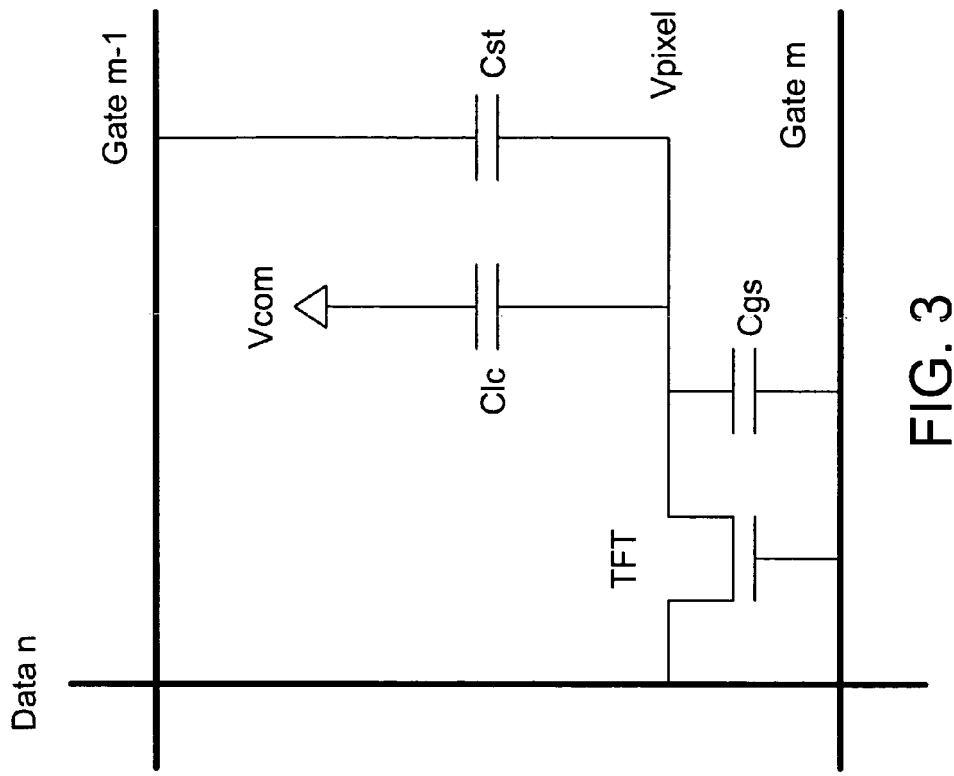
FIG. 3 is an equivalent circuit showing various electrical components in a pixel in another prior art LCD device.
Figure 1:
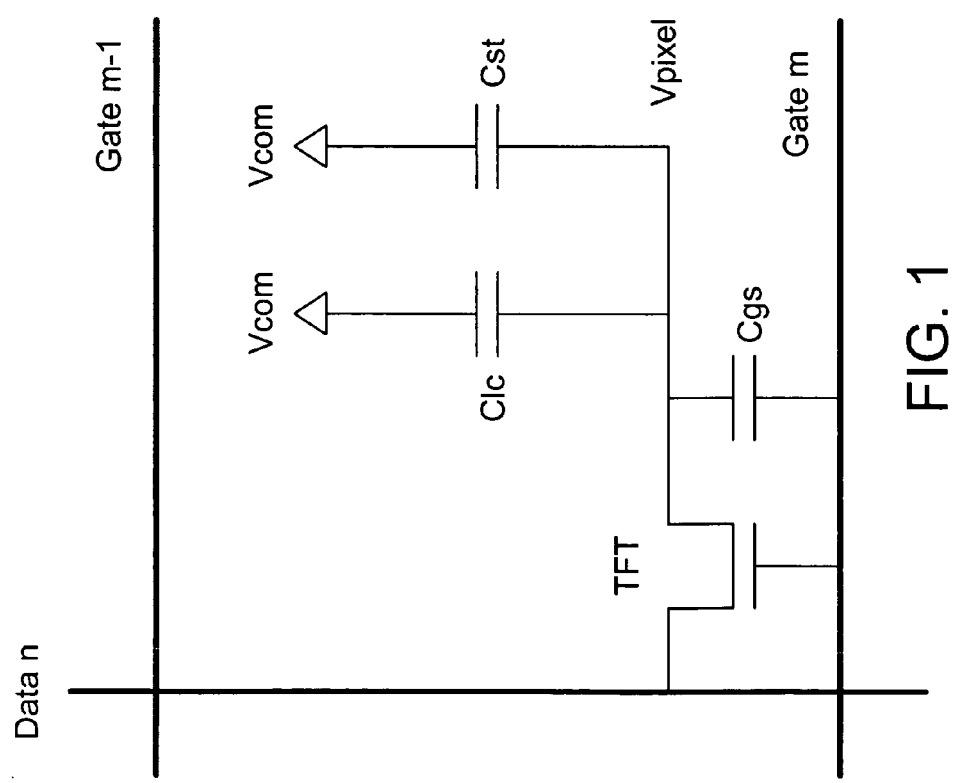
FIG. 1 is an equivalent circuit showing various electrical components in a pixel in a prior art LCD device.
Figure 2:
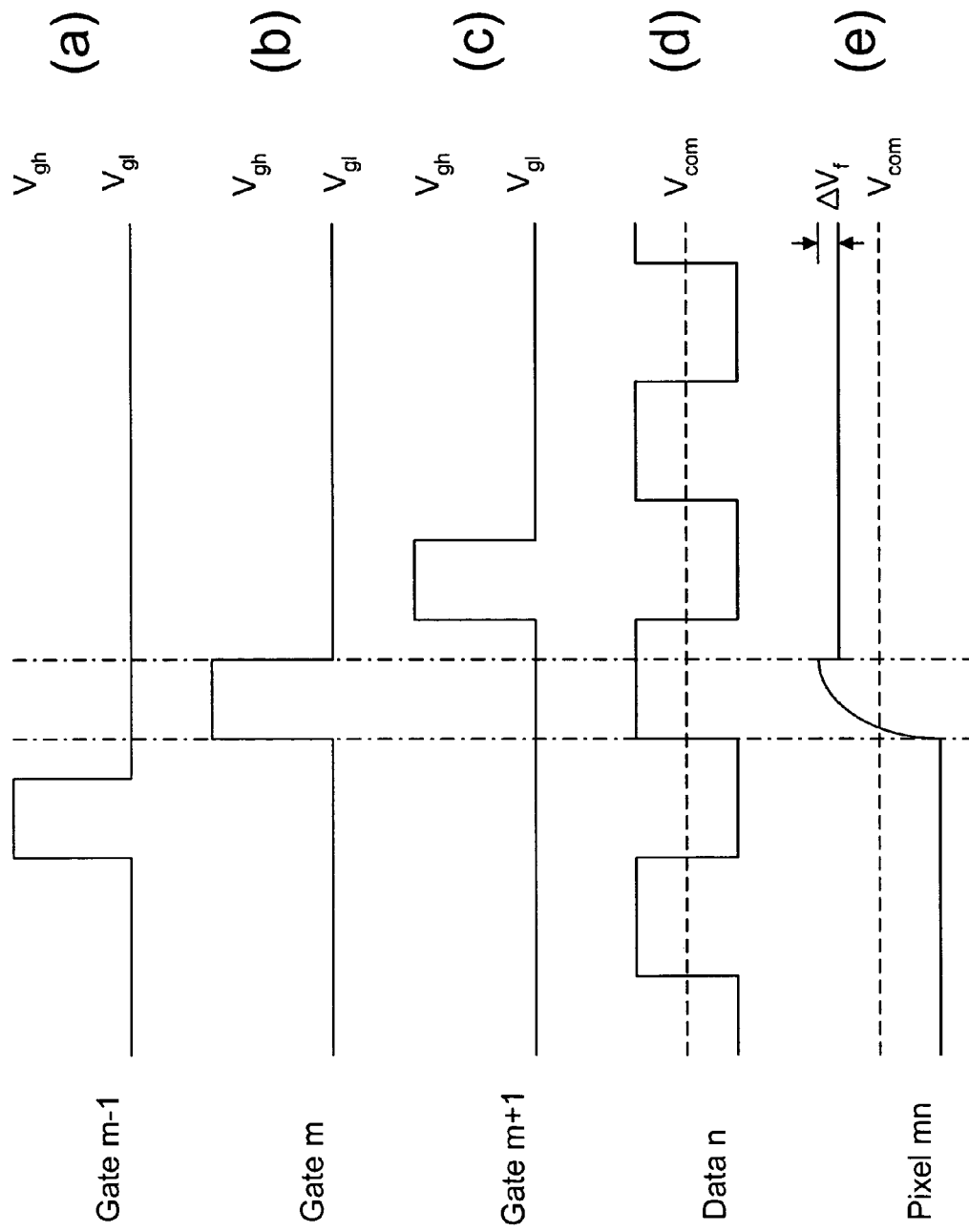
Figure 4:
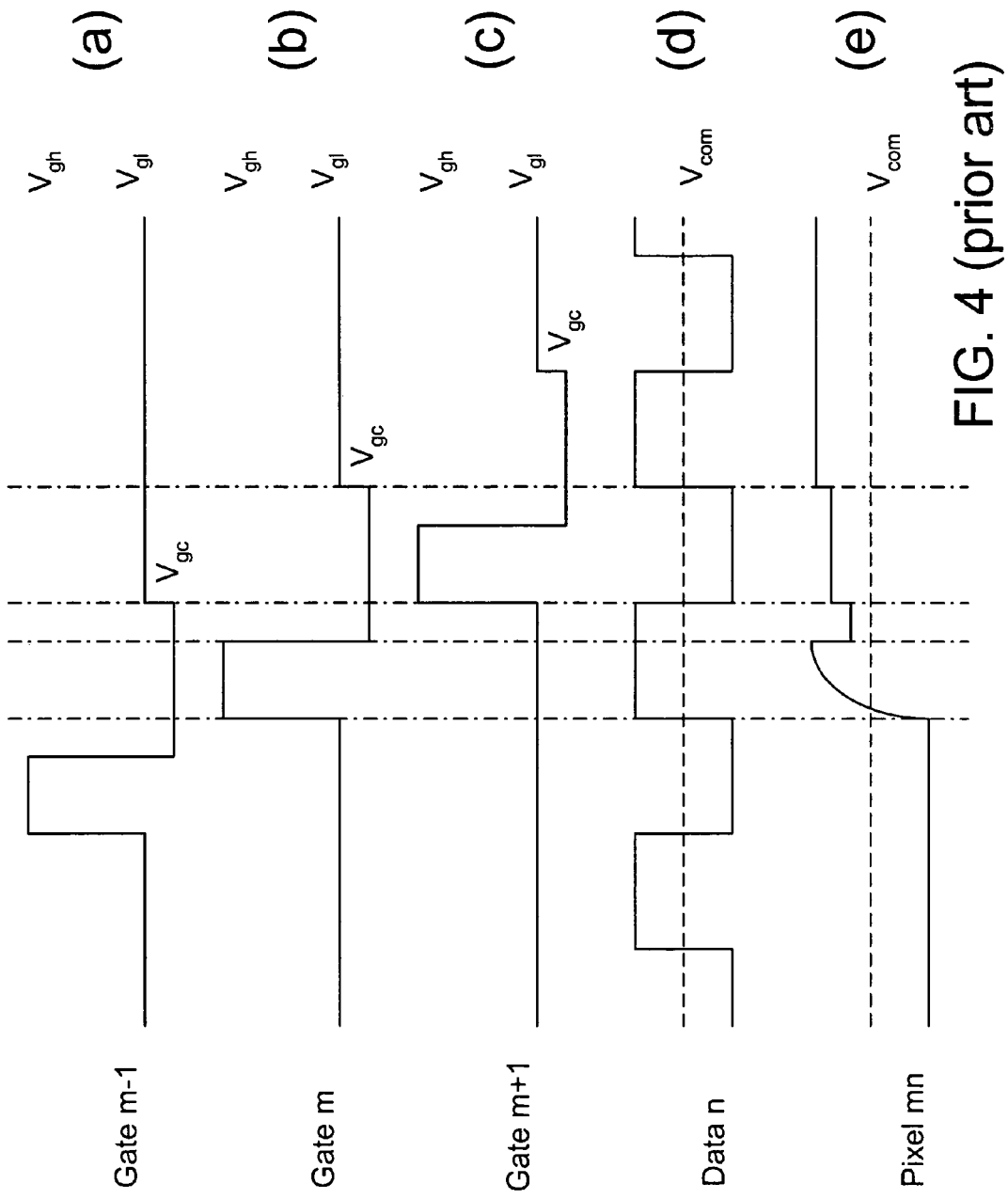
Figure 5:
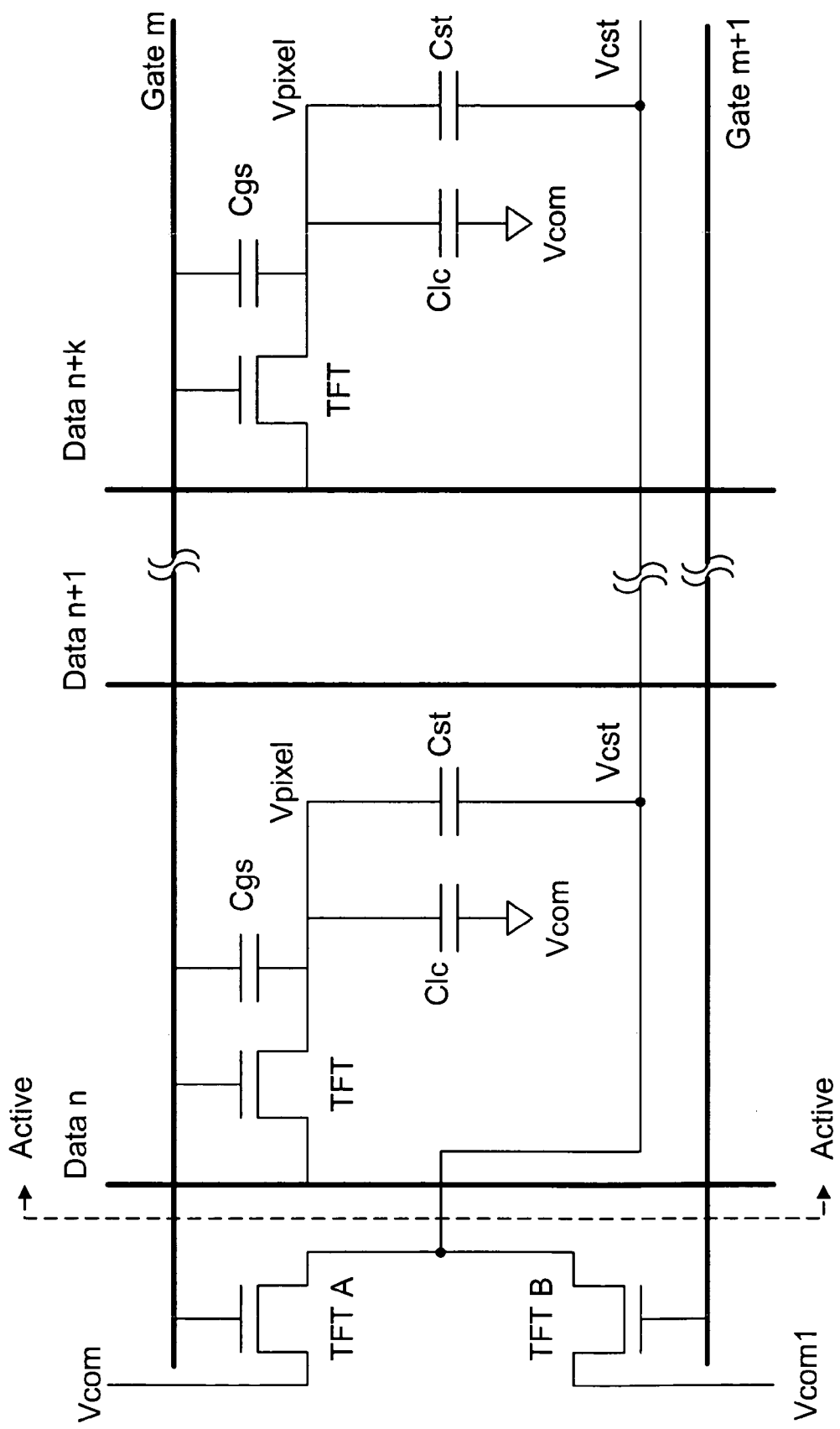
FIG. 5 is an equivalent circuit showing various electrical components in a plurality of pixels in an LCD device, according to one embodiment of the present invention.
Figure 6:
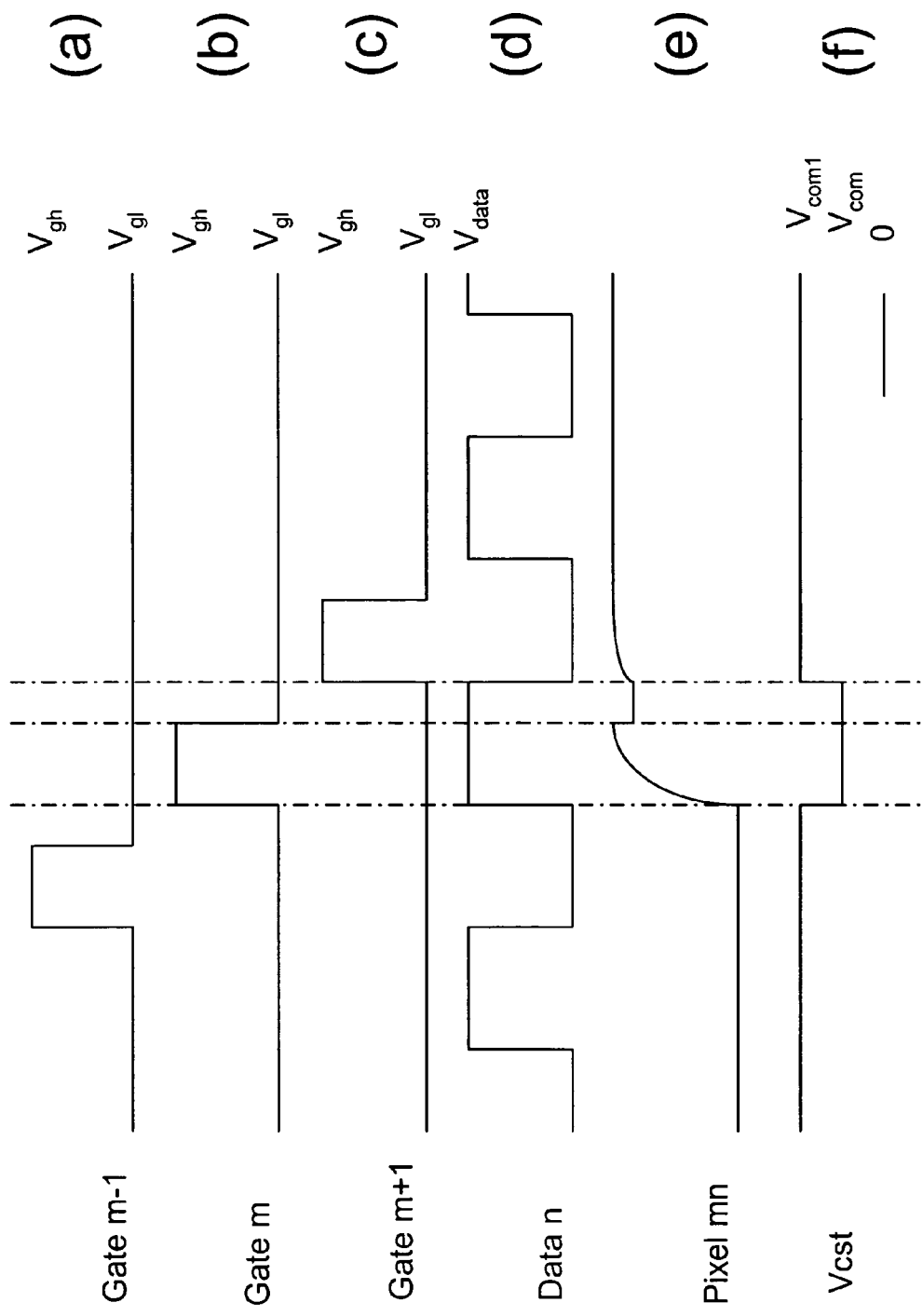

The present invention makes use of different signal levels in the common line voltages to compensate for the feed-through potential drop. As with prior art, the voltage potential associated with the charge capacity $C_{lc}$ is determined by the pixel voltage $V_{pixel}$ and the signal level $V_{com}$ at a common line. In contrast to prior art, the voltage on one end of the additional charge storage capacitor $C_{st}$ is switched between $V_{com}$ and $V_{com1}$, as shown in FIG. 5. In one embodiment of the present invention, these voltage levels are controlled by TFT A and TFT B before the signal line $V_{Cst}$ enters the active area of the LCD device. As shown in FIG. 6, when the signal level at gate line m is high (gate line m+1 being at $V_{gl}$), the switching TFT A and TFT are in the "ON" state but TFT B is "OFF". The voltage potential across $C_{lc}$ is $(V_{data}-V_{com})$ and the voltage across $C_{st}$ is also $(V_{data}-V_{com})$. The voltage potential across $C_{gs}$ is $(V_{data}-V_{gh})$. The total charge on these capacitors is $$Q_{pixel}=(C_{lc}+C_{st})(V_{data}-V_{com})+C_{gs}(V_{data}-V_{gh}). \quad (3)$$

After the signal level at gate line m is changed from $V_{gh}$ to $V_{gl}$ but before the signal level at gate line m+1 becomes $V_{gh}$, the voltage potential across $C_{lc}$ and $C_{st}$ is $(C_{lc}+C_{st})(V_{data}-\Delta V_f-V_{com})$ and the voltage potential across $C_{gs}$ is $(V_{data}-\Delta V_f-V_{gl})$. Th total charge on these capacitors is $$Q_{pixel}=(C_{lc}+C_{st})(V_{data}-\Delta V_f-V_{com})+C_{gs}(V_{data}-\Delta V_f-V_{gl}). \quad (4)$$

By comparing Equation 3 with Equation 4, we have the feed-through potential drop $\Delta V_f$ as shown in Equation 1:

$$C_{gs}(V_{gl}-V_{gh})=(C_{lc}+C_{st}+C_{gs})(-\Delta V_f)$$

or $$\Delta V_f=C_{gs}(V_{gh}-V_{gl})/(C_{lc}+C_{st}+C_{gs}). \quad (5)$$

When the signal level at gate line m+1 is $V_{gh}$, the switching TFT B is "ON". The voltage $V_{Cst}$ is $V_{com1}$ and the total charge after charging is $$Q_{pixel}=C_{st}(V_{pixel}-V_{com1})+C_{lc}(V_{pixel}-V_{com})+C_{gs}(V_{pixel}-V_{gl}). \quad (6)$$

In order to compensate for the feed-through potential drop, we have $V_{pixel}=V_{data}$. By comparing Equations 3 and 6, we have $$C_{st}(-V_{com1})+C_{gs}(-V_{gl})=C_{st}(-V_{com})+C_{gs}(-V_{gh})$$

or $$V_{com1}=V_{com}+(C_{gs}/C_{st})(V_{gh}-V_{gl}). \quad (7)$$

The signal levels at various components associated with the pixel (m, n) are shown in FIG. 6. In particular, the signal level ($V_{pixel}$) common to $C_{gs}$, $C_{lc}$ and $C_{st}$ is shown in FIG. 6e. As shown, the voltage level after the voltage $V_{Cst}$ is changed from $V_{com}$ to $V_{com1}$, $V_{pixel}$ is increased until the charges on various capacitors become equilibrium.

This exemplary embodiment demonstrates that it is possible to apply different common line voltages to the charge storage capacitor in order to improve the performance of an LCD device by reducing the effect of feed-through potential drop.

Figure 7:
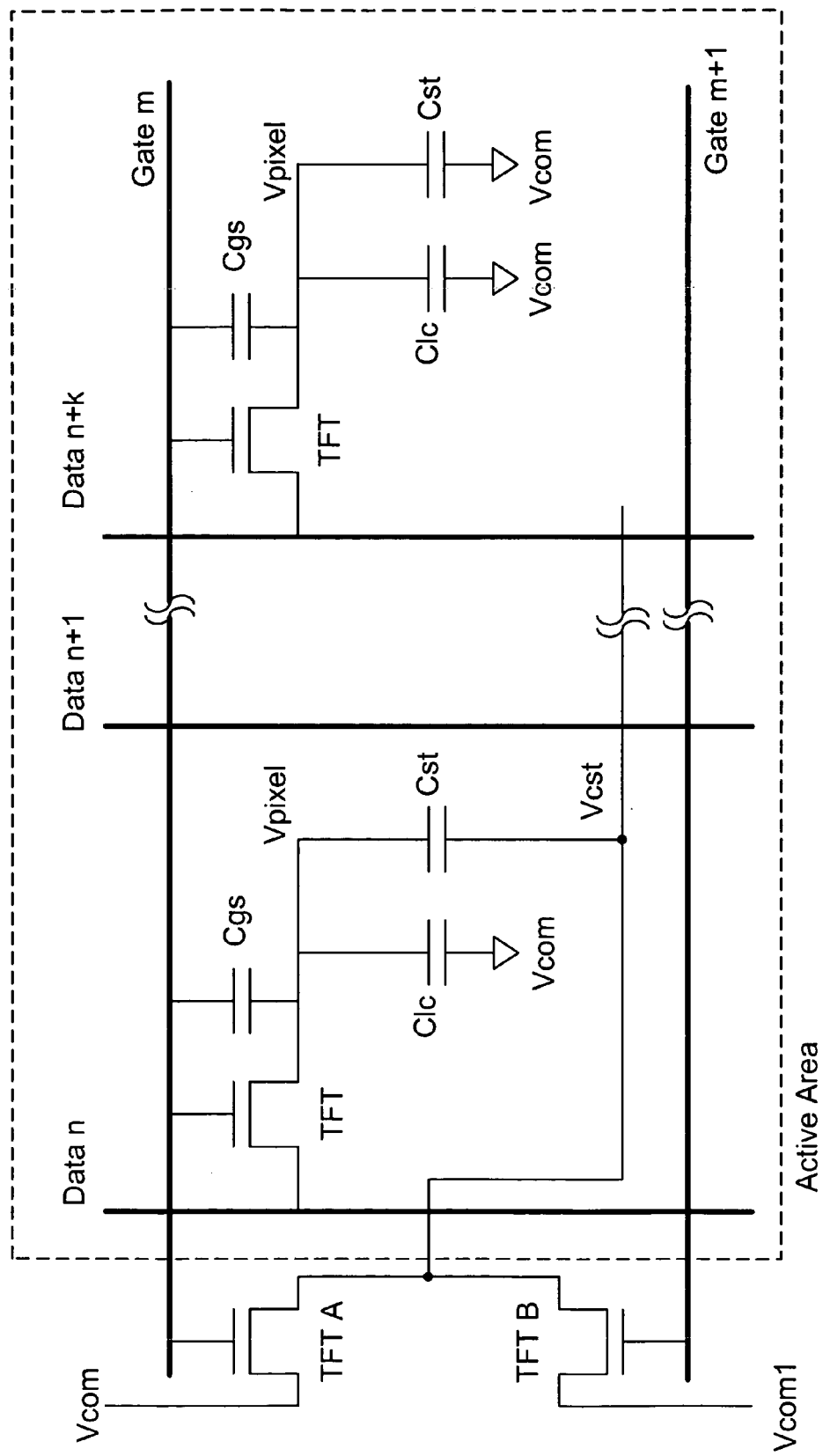
FIG. 7 is an equivalent circuit showing various electrical components in a plurality of pixels in an LCD device, according to another embodiment of the present invention.

In a large area LCD device, sometimes the feed-through potential drop on the right side is different from the feed-through potential drop on the left side. It is possible to use different common line voltages on different sides of the device. For example, the compensation for the feed-through potential drop is realized only on the left side of the LCD device, as shown in FIG. 7. As shown, the switching between Vcom and Vcom1 is applied only to the pixels on the left side of the LCD device. On the right side of the LCD device, both $C_{lc}$ and $C_{st}$ are associated with Vcom as in prior art.

Figure 8:
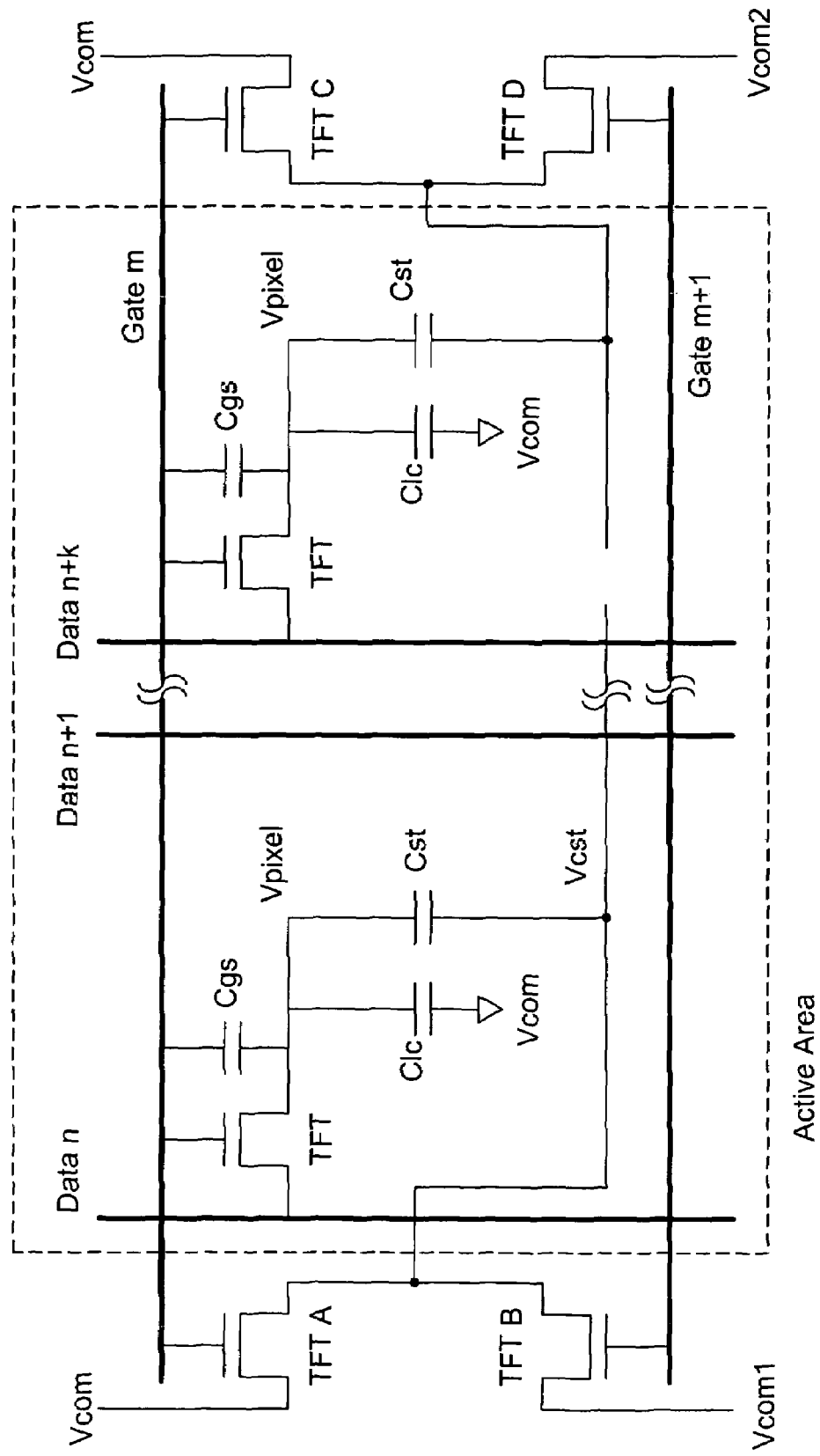
FIG. 8 is an equivalent circuit showing various electrical components in a plurality of pixels in an LCD device, according to yet another embodiment of the present invention.

In another embodiment as shown in FIG. 8, the common line voltage on the left side is switched between $V_{com}$ and $V_{com1}$ through the control of TFT A and TFT B, but the common line voltage on the right side is switched between $V_{com}$ and $V_{com2}$ through the control of TFT C and TFT D.

Figure 9:
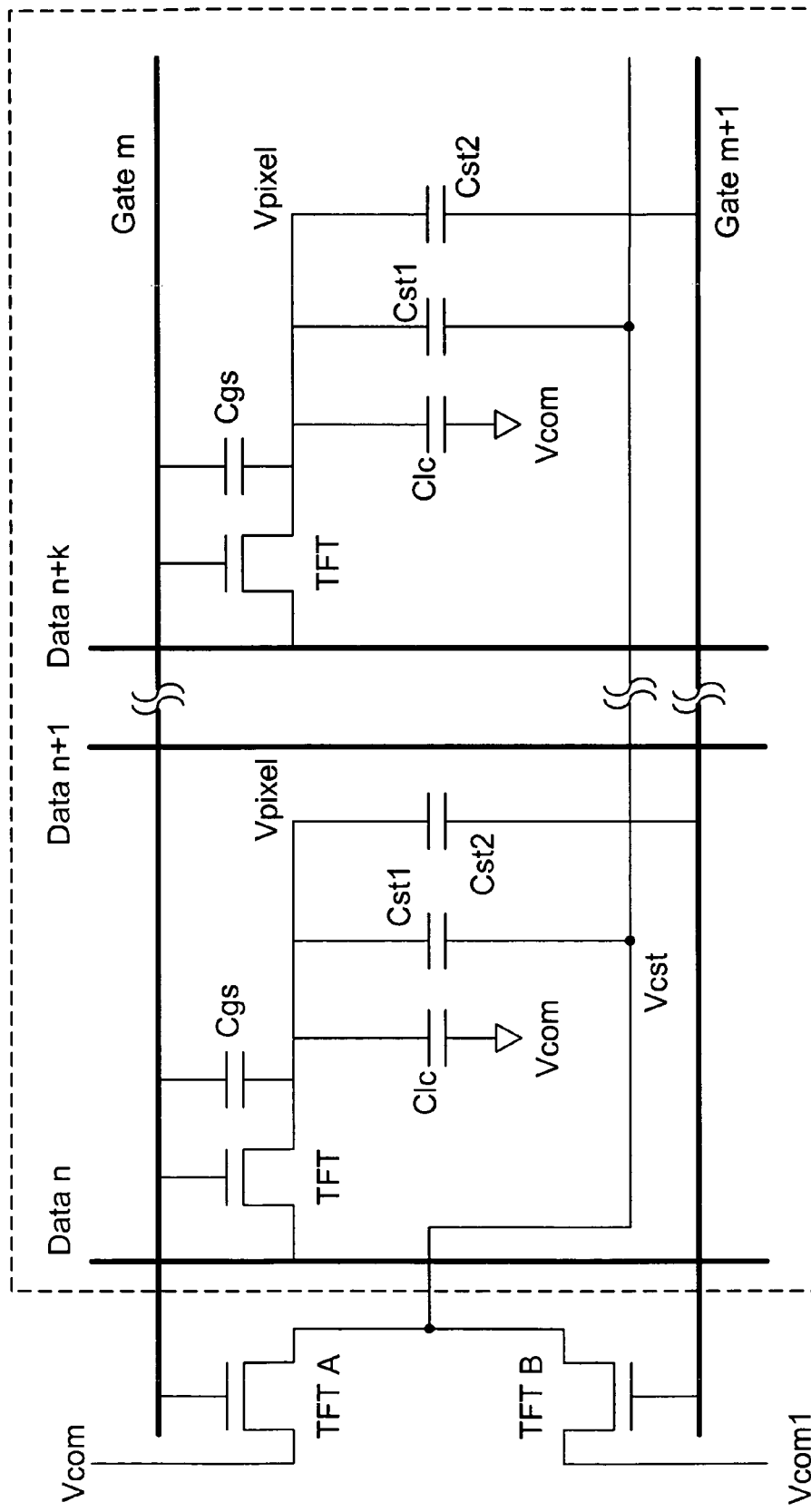
FIG. 9 is an equivalent circuit showing various electrical components in a plurality of pixels in an LCD device, according to a different embodiment of the present invention.

In yet another embodiment of the present invention, instead of using one charge storage capacitor $C_{st}$ as shown in FIG. 5, two charge storage capacitors $C_{st1}$ and $C_{st2}$ are used in a pixel. As shown in FIG. 9, while the connection of $C_{st1}$ is the same as FIG. 5, $C_{st2}$ is connected to the gate line m+1. As such, after the signal level at gate line m+1 is changed from $V_{gl}$ to $V_{gh}$, the feed-through potential drop is reduced by both the voltage change on $C_{st1}$ from $V_{com}$ to $V_{com1}$, and the voltage change on $C_{st2}$ from $V_{gl}$ to $V_{gh}$.

Figure 10:
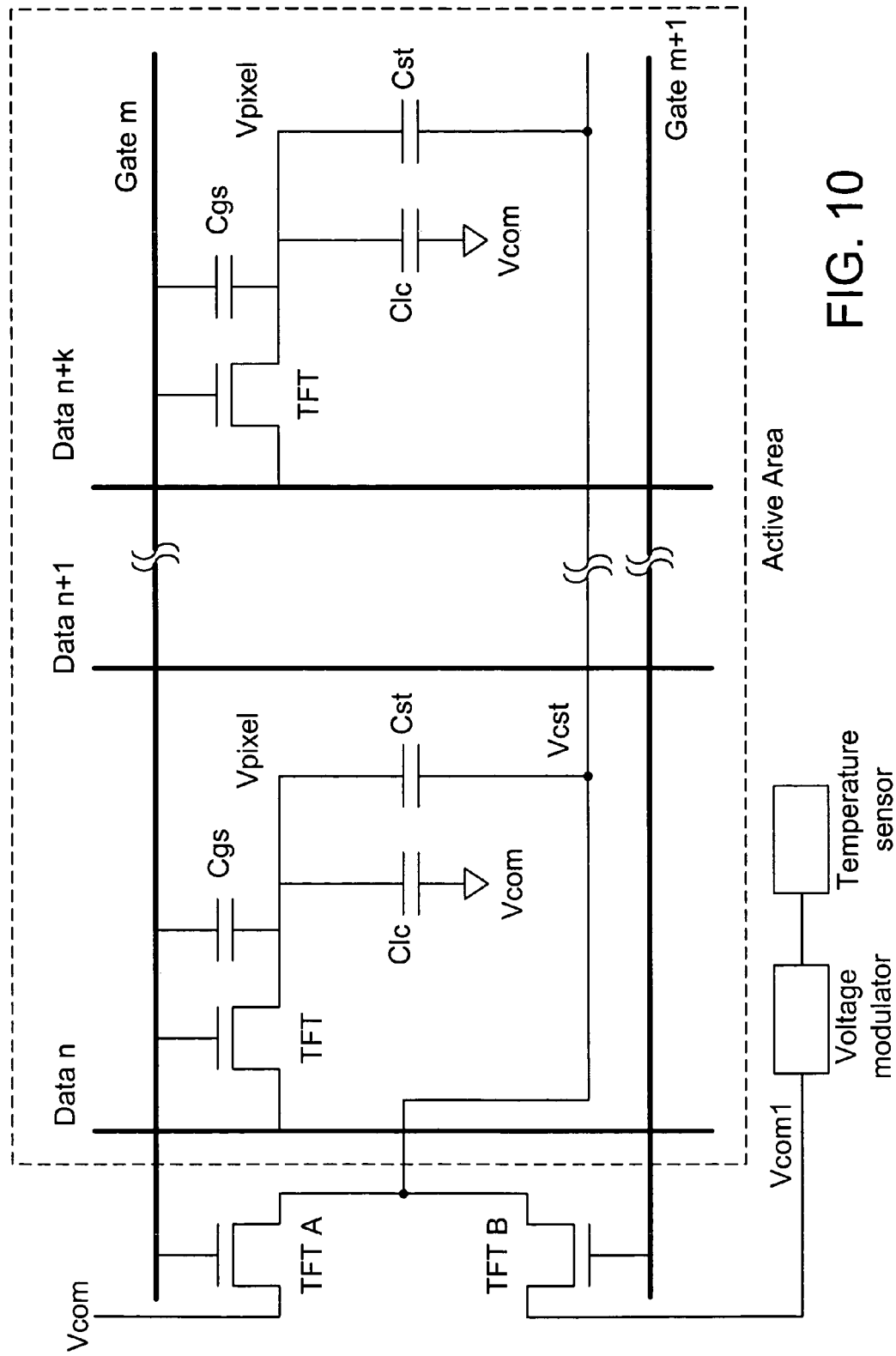
FIG. 10 is an equivalent circuit showing various electrical components in a plurality of pixels in an LCD device, according to another different embodiment of the present invention.

In a different embodiment of the present invention, instead of a constant voltage level $V_{com1}$, a variable $V_{com1}$ is used. As shown in FIG. 10, a temperature sensor is used to change the signal level of $V_{com1}$ through a voltage modulator. In general, when ambient temperature changes, the liquid crystal efficiency will also change. In order to maintain the same efficiency, the driver voltage on the liquid crystal can be adjusted. When the temperature sensor detects a change in the ambient temperature, it passes information to the voltage modulator, which will look up a value to adjust the driver voltage accordingly.

Figure 11:
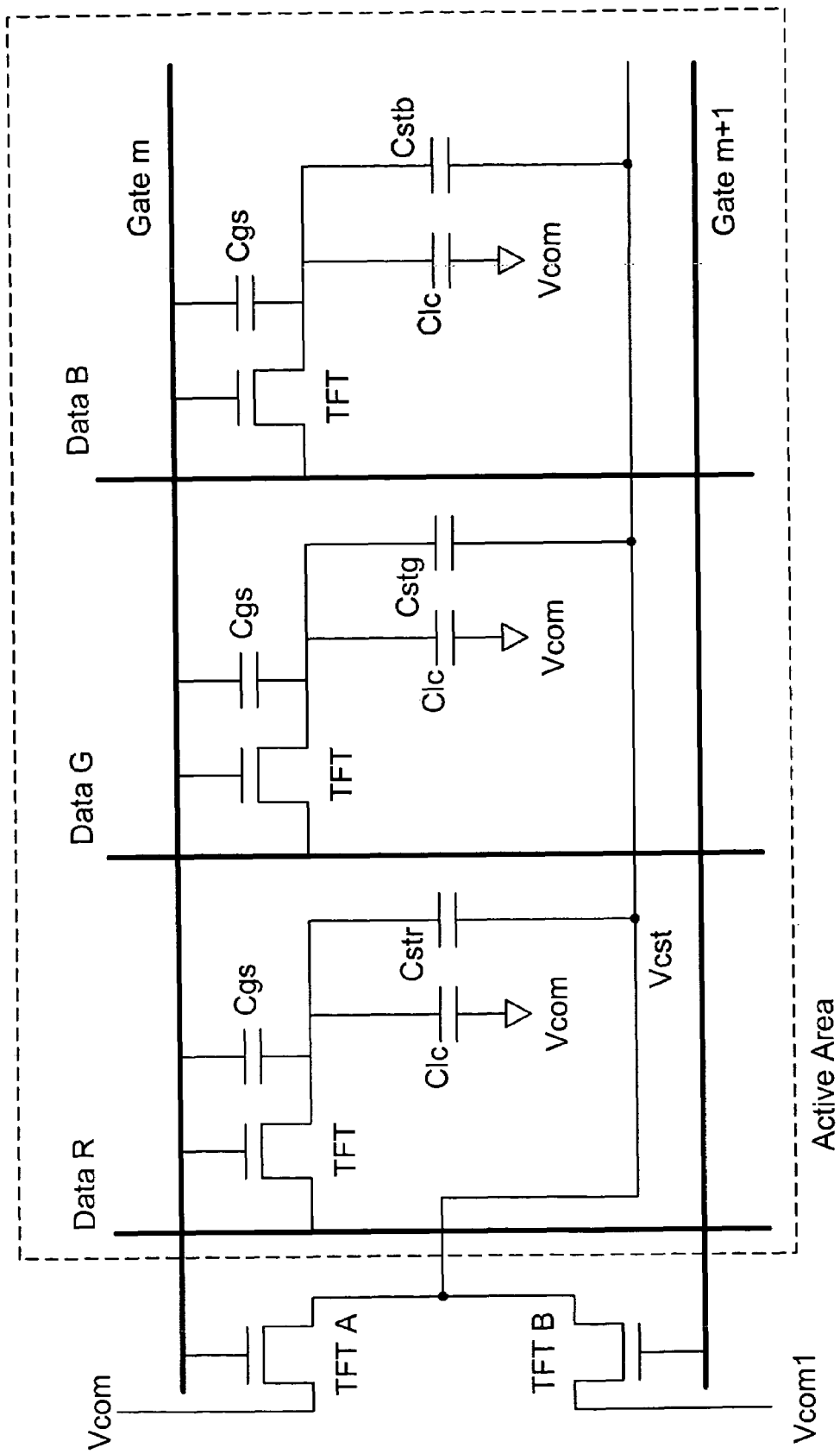
FIG. 11 is an equivalent circuit showing various electrical components in a plurality of color sub-pixels in an LCD device, according to the present invention.
Figure 12:
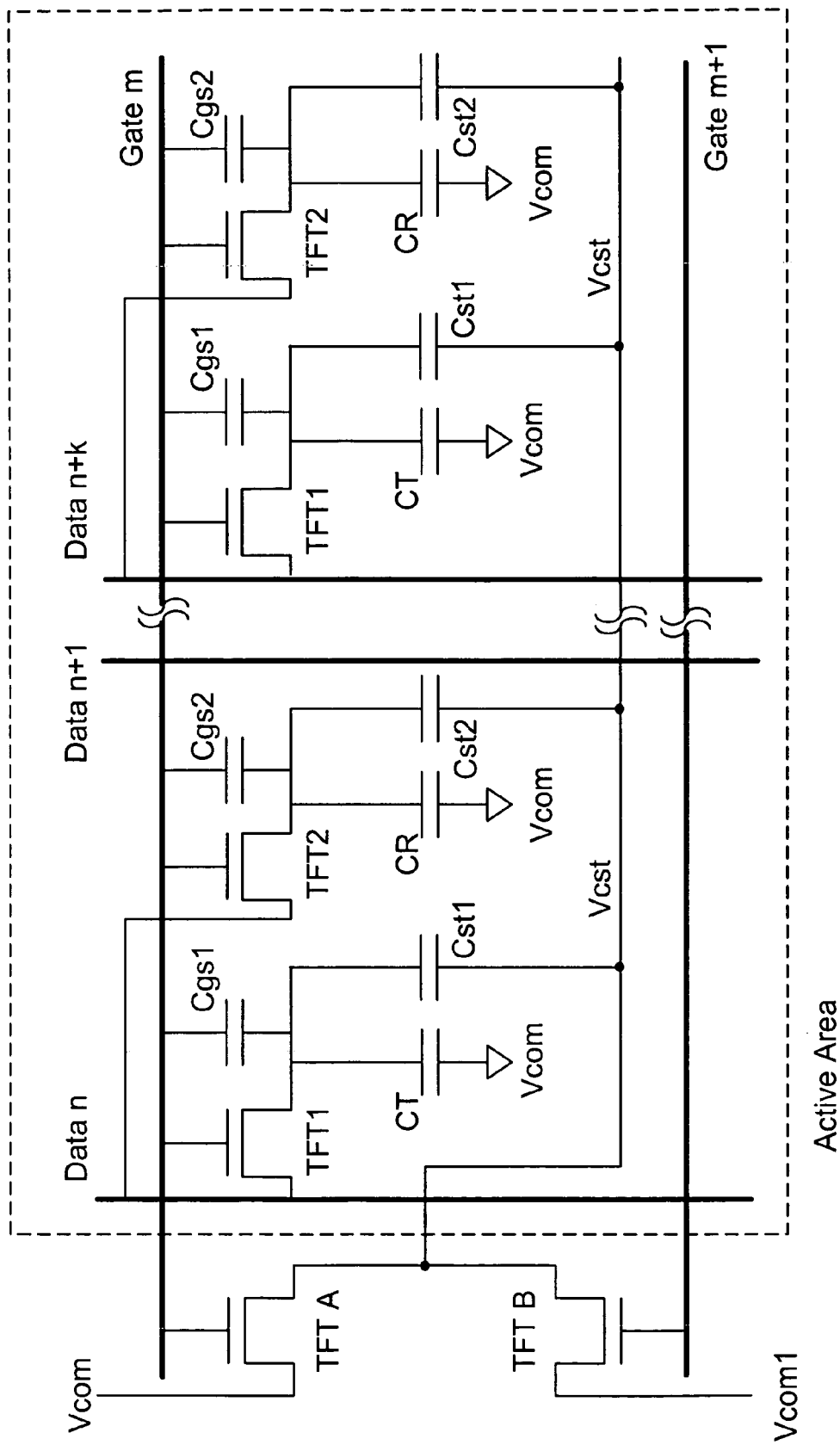
FIG. 12 is an equivalent circuit showing various electrical components in a plurality of pixels in a transflective LCD device, according to the present invention.

It should be appreciated that the embodiments, as shown in FIGS. 5 and 7-10, can be used in a black-and-white LCD device as well as a color LCD device. For example, in a color LCD device where a pixel is divided into three color sub-pixels R, G and B, the switching between $V_{com}$ and $V_{com1}$ is applied to the charge storage capacitors $C_{str}$, $C_{stg}$ and $C_{stb}$ in different sub-pixels, as shown in FIG. 11. In general, the storage capacitors $C_{str}$, $C_{stg}$ and $C_{stb}$ are designed to have different values from each other. As such, the voltage potential at each of the color sub-pixel can be compensated differently. The differences in the pixel potential among $C_{str}$, $C_{stg}$ and $C_{stb}$ are designed according to gamma curve requirement. Furthermore, the switching between $V_{com}$ and $V_{com1}$ can also be applied to a transflective LCD where a pixel is divided into a transmissive area and a reflective area. As is known in the art, the transmissive area has a transmissive electrode and the reflective area has a separate reflective electrode. As shown in FIG. 12, the charge capacity associated with the transmissive electrode is represented by $C_T$ and the charge capacity associated with the reflective electrode is $C_R$. Each of the areas has its own TFT, $C_{gs}$ and $C_{st}$. Here the subscripts 1 and 2 represent the transmissive area and the reflective area, respectively.

Figure 13:
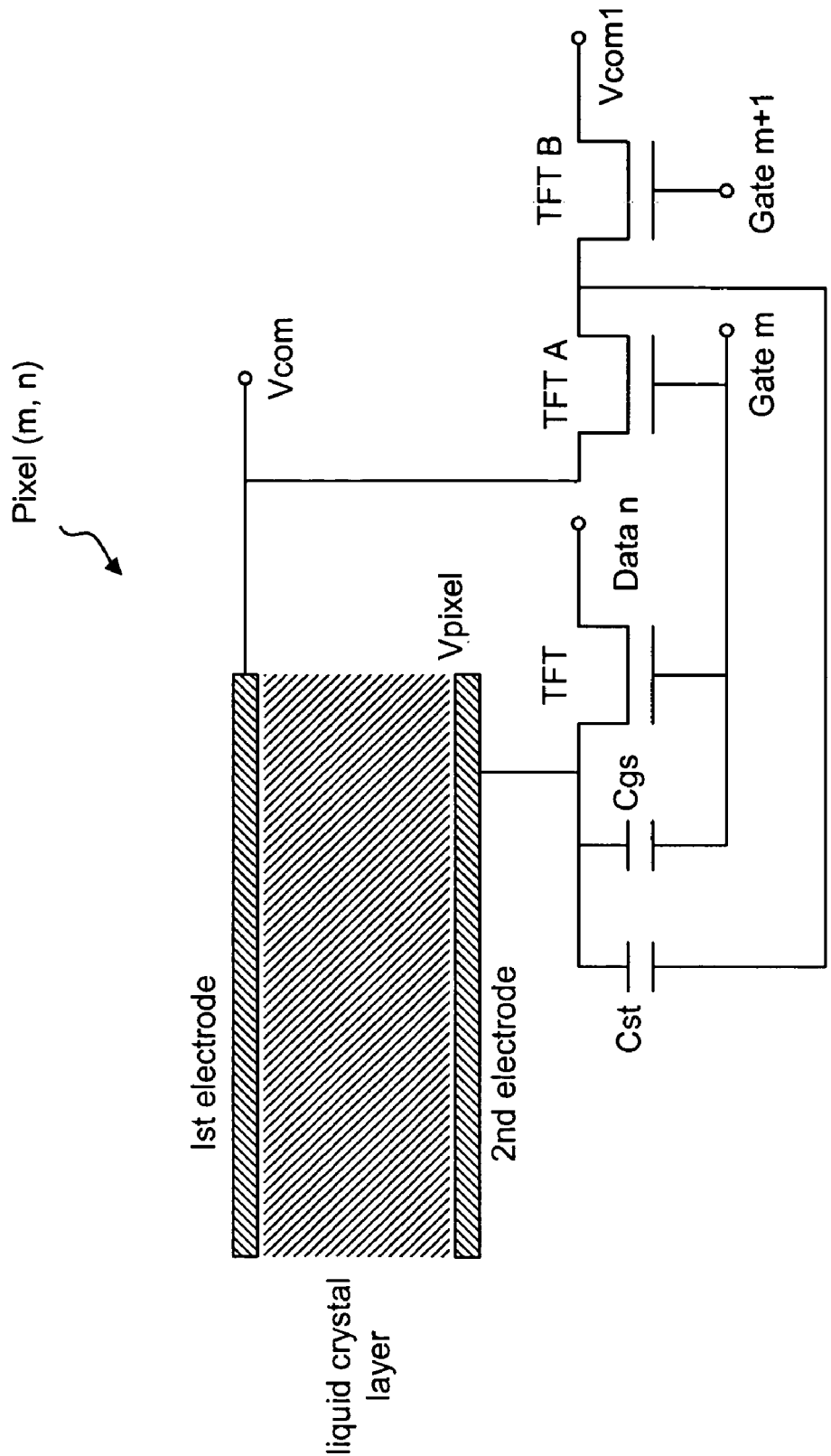
FIG. 13 is schematic representation showing the voltage application on the electrodes in a pixel in a LCD panel.

It should also be appreciated that, in FIGS. 5 and 7-11, $C_{lc}$ is the capacitance associated with the liquid crystal layer between two electrodes as shown in FIG. 13. As shown in FIG. 13, a pixel (m, n) comprises a first electrode and a second electrode. This pixel (m, n) is representative of that shown in FIG. 5. As shown, the first electrode is connected to $V_{com}$ and the second electrode is connected to switching element TFT, capacitor $C_{gs}$ and capacitor $C_{st}$.

In sum, the present invention uses different values of $V_{com}$ at different signal stages in order to reduce the effect of feed-through potential drops. The switching between different $V_{com}$ values can be applied to charge storage capacitors in all or some of the pixels in the active area of a LCD device.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A liquid crystal display having a pixel area comprising a plurality of pixels arranged in a plurality of pixel rows, a plurality of gate lines for providing gate line signals and a plurality of data lines for providing data signals to the plurality of pixels, each pixel having
    a pixel switching element;
    a first electrode,
    a second electrode,
    a liquid crystal layer segment disposed between the first and second electrodes, the first electrode electrically connected to a first voltage and the second electrode electrically connected to a data line through the pixel switching element for receiving a data signal during a gate line signal, and
    a charge storage capacitor having a first capacitor end and a second capacitor end, the first capacitor end electrically connected to the second electrode, wherein the plurality of pixel rows comprise a pixel row and an adjacent pixel row, and the plurality of gate lines comprise a first gate line for providing the gate line signal to the pixel row and a second gate line for providing a next gate line signal to the adjacent pixel row, said liquid crystal display comprising:
    a first switching element having a control end connected to the first gate line, a first switching end connected to a voltage source, and a second switching end connected to the second capacitor end of the charge storage capacitor so as to apply a second voltage to the charge storage capacitor only during the gate line signal, and
    a second switching element having a control end connected to the second gate line, a first switching end connected to a different voltage source, and a second switching end connected to the second capacitor end of the charge storage capacitor so as to apply a third voltage to the charge storage capacitor only during the next gate line signal, wherein the third voltage in at least some of the plurality of pixels is greater than the second voltage, wherein the first switching element and the second switching element are disposed outside the pixel area.

2. The liquid crystal display of claim 1, wherein each of the pixel rows has a first side and an opposing second side, and said some of the plurality of pixels are located on the first side and some other of the plurality of pixels are located on the second side.

3. The liquid crystal display of claim 2, wherein the second voltage in said some other pixels is substantially equal to the first voltage.

4. The liquid crystal display of claim 2, wherein the second voltage in said some other pixels is also greater than the first voltage.

5. The liquid crystal display of claim 4, further comprising a temperature sensor operatively connected to the voltage source, the temperature sensor adapted to sense a temperature of the liquid crystal display for providing a signal indicative of the sensed temperature, so as to change the third voltage at least based on the sensed temperature.

6. The liquid crystal display of claim 2, wherein the second voltage in said some pixels is different from the second voltage in said some other pixels.

7. The liquid crystal display of claim 1, wherein the plurality of pixel rows include a pixel row m and an adjacent pixel row m+1 and the plurality of gate lines include a gate line m for driving the pixel row m and a gate line m+1 for driving the pixel row m+1 and wherein
    the gate line signal is provided to the gate line m for driving the pixel row m, and
    the next gate line signal is provided to the gate line m+1 for driving the pixel row m+1.

8. The liquid crystal display of claim 7, wherein each pixel further comprises a further storage capacitor, the further charge storage capacitor having a first capacitor end and a second capacitor end, the first capacitor end electrically connected to the second electrode, the second capacitor end electrically connected to the gate line m+1.

9. The liquid crystal of claim 1, wherein each pixel has a transmission sub-pixel and a reflective sub-pixel, and wherein
    the second electrode comprises a transmissive electrode in the transmission sub-pixel, and
    the reflective sub-pixel comprises a third electrode electrically connected to the data line through another switching element for receiving the data signal during the gate line signal, the reflective sub-pixel further comprising a further charge storage capacitor having a first capacitor end and a second capacitor end, the first capacitor end electrically connected to the third electrode, and wherein the second voltage is also applied to the second capacitor end of the further charge storage capacitor.

10. The liquid crystal display of claim 1, wherein each pixel has a first color sub-pixel, a second color sub-pixel and a third color sub-pixel, and wherein the second electrode comprises a first sub-electrode in the first color sub-pixel, a second sub-electrode in the second color sub-pixel and a third sub-electrode in the third color sub-pixel, the first sub-electrode electrically connected to the first end of the charge storage capacitor, wherein the second color sub-pixel further comprises a second charge storage capacitor having a first capacitor end and a second capacitor end, the first capacitor end electrically connected to the second sub-electrode, and the third color sub-pixel further comprises a third charge storage capacitor having a first capacitor end and a second capacitor end, the first capacitor end electrically connected to the third sub-electrode, and wherein the second voltage is also applied to the second capacitor end of the second charge storage capacitor and the second capacitor end of the third charge storage capacitor.

11. A liquid crystal display having a pixel area comprising a plurality of pixels arranged in a plurality of pixel rows, a plurality of gate lines for providing gate line signals and a plurality of data lines for providing data signals to the plurality of pixels, each pixel comprising a switching element;
a first electrode,
a second electrode,
a liquid crystal layer segment disposed between the first and second electrodes, the first electrode electrically connected to a first voltage source for receiving a first voltage and the second electrode electrically connected to a data line through the switching element for receiving a data signal during a gate line signal, and
a charge storage capacitor having a first capacitor end and a second capacitor end, the first capacitor end electrically connected to the second electrode, said liquid crystal display comprising:
a first transistor and a second transistor disposed outside the pixel area, each of the first and second transistors having a first switching end, a second switching end and a control end, wherein the second switching end of the first transistor and the second switching end of the second transistor are electrically connected to the second capacitor end of the charge storage capacitor, and wherein the first switching end of the first transistor is connected to the first voltage source and the control end of the first transistor is electrically connected to one of the gate lines to receive the gate line signal so as to apply the first voltage to the charge storage capacitor through the first transistor only during the gate line signal, and wherein the first switching end of the second transistor is connected a second voltage source and the control end of the second transistor is electrically connected to a different one of the gate lines so as to apply a second voltage to the charge storage capacitor via the second transistor only during a subsequent gate line signal, wherein the second voltage in at least some of the plurality of pixels is greater than the first voltage.

12. The liquid crystal display of claim 11, wherein each of the pixel rows has a first side and an opposing second side, and said some of the plurality of pixels are located on the first side and some other of the plurality of pixels are located on the second side, wherein the second voltage is applied to the charge capacitor in said some of the plurality of pixels, said liquid crystal display further comprising:

a third transistor and a fourth transistor disposed out the pixel area, each of the third and fourth transistors having a first switching end, a second switching end and a control end, wherein the second switching end of the third transistor and the second switching end of the fourth transistor are electrically connected to the charge storage capacitor in said some other of the plurality of pixels, and wherein the first switching end of the third transistor is connected to the first voltage source and the control end of the third transistor is electrically connected to said one of the gate lines to receive the gate line signal so as to apply the first voltage to the charge storage in said some other of the plurality of pixels through the third transistor, and wherein the first switching end of the fourth transistor is connected to a third voltage source and the control end of the fourth transistor is electrically connected to said different one of the gate lines so as to apply a third voltage to the charge storage capacitor of said some other of the plurality of pixels via the fourth transistor during said subsequent gate line signal.

13. The liquid crystal display of claim 12, wherein the third voltage is greater than the first voltage.

14. The liquid crystal display of claim 12, wherein the third voltage is substantially equal to the first voltage.

15. The liquid crystal display of claim 11, wherein each pixel further comprises a further storage capacitor, the further charge storage capacitor having a first capacitor end and a second capacitor end, the first capacitor end electrically connected to the second electrode, the second capacitor end electrically connected to said different one of the gate lines.

16. The liquid crystal display of claim 11, further comprising a temperature sensor operatively connected to the voltage source, the temperature sensor adapted to sense a temperature of the liquid crystal display for providing a signal indicative of the sensed temperature, so as to change the second voltage at least based on the sensed temperature.

17. The liquid crystal of claim 11, wherein each pixel has a transmission sub-pixel and a reflective sub-pixel, and wherein the second electrode comprises a transmissive electrode in the transmission sub-pixel, and the reflective sub-pixel comprises a third electrode electrically connected to the data line through another switching element for receiving the data signal during the gate line signal, the reflective sub-pixel further comprising a further charge storage capacitor having a first capacitor end and a second capacitor end, the first capacitor end electrically connected to the third electrode, and wherein the first voltage is also applied to the second capacitor end of the further charge storage capacitor.

18. The liquid crystal display of claim 11, wherein each pixel has a first color sub-pixel, a second color sub-pixel and a third color sub-pixel, and wherein the second electrode comprises a first sub-electrode in the first color sub-pixel, a second sub-electrode in the second color sub-pixel and a third sub-electrode in the third color sub-pixel, the first sub-electrode electrically connected to the first end of the charge storage capacitor, wherein the second color sub-pixel further comprises a second charge storage capacitor having a first capacitor end and a second capacitor end, the first capacitor end electrically connected to the second sub-electrode, and the third color sub-pixel further comprises a third charge storage capacitor having a first capacitor end and a second capacitor end, the first capacitor end electrically connected to the third sub-electrode, and wherein the first voltage is also applied to the second capacitor end of the second charge storage capacitor and the second capacitor end of the third charge storage capacitor.

* * * * *

UNITED STATES PATENT AND TRADEMARK OFFICE
CERTIFICATE OF CORRECTION

PATENT NO. : 7,652,649 B2  Page 1 of 1
APPLICATION NO. : 11/154773
DATED : January 26, 2010
INVENTOR(S) : Hsueh-Ying Huang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Twenty-eighth Day of December, 2010

David J. Kappos
*Director of the United States Patent and Trademark Office*